US008631397B2

(12) United States Patent
Brar et al.

(10) Patent No.: US 8,631,397 B2
(45) Date of Patent: *Jan. 14, 2014

(54) VIRTUALIZED APPLICATION IMAGE PATCHING

(75) Inventors: Gurashish Singh Brar, Redmond, WA (US); Joe Keng Yap, Sammamish, WA (US); Trevor William McDiarmid, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

This patent is subject to a terminal disclaimer.

(21) Appl. No.: 12/059,978

(22) Filed: Mar. 31, 2008

(65) Prior Publication Data

US 2009/0249324 A1 Oct. 1, 2009

(51) Int. Cl.
*G06F 9/44* (2006.01)

(52) U.S. Cl.
USPC ............... 717/173; 717/170; 717/171; 718/1

(58) Field of Classification Search
USPC ...................................... 717/168–178; 718/1
See application file for complete search history.

(56) References Cited

U.S. PATENT DOCUMENTS

| | | | |
|---|---|---|---|
| 6,202,208 B1 | 3/2001 | Holiday, Jr. ...................... 717/11 |
| 6,735,601 B1 * | 5/2004 | Subrahmanyam .................... 1/1 |
| 6,938,109 B1 | 8/2005 | Slinger et al. .................... 710/68 |
| 7,185,332 B1 | 2/2007 | Waldin et al. .................. 717/170 |
| 7,373,451 B2 * | 5/2008 | Lam et al. ........................ 711/6 |
| 7,676,628 B1 * | 3/2010 | Compton et al. ............. 711/114 |
| 8,209,680 B1 * | 6/2012 | Le et al. ......................... 717/174 |
| 2004/0088694 A1 | 5/2004 | Ho .................................. 717/170 |
| 2005/0080823 A1 | 4/2005 | Collins ........................... 707/200 |
| 2005/0132382 A1 | 6/2005 | McGuire et al. ............... 719/311 |
| 2006/0112152 A1 | 5/2006 | Napier et al. .................. 707/203 |
| 2006/0174240 A1 * | 8/2006 | Flynn ............................. 717/170 |
| 2006/0184935 A1 * | 8/2006 | Abels et al. ....................... 718/1 |
| 2006/0225059 A1 * | 10/2006 | Plaxton et al. ................. 717/148 |
| 2007/0106701 A1 | 5/2007 | Periyasamy .................. 707/200 |
| 2007/0143530 A1 | 6/2007 | Rudelic et al. ................ 711/103 |
| 2007/0162521 A1 * | 7/2007 | Raghunath .................... 707/202 |
| 2007/0220021 A1 * | 9/2007 | Kato et al. ..................... 707/100 |
| 2007/0234356 A1 * | 10/2007 | Martins et al. .................... 718/1 |
| 2008/0215796 A1 * | 9/2008 | Lam et al. ...................... 711/100 |
| 2009/0216811 A1 * | 8/2009 | Manczak et al. .............. 707/201 |
| 2009/0222462 A1 * | 9/2009 | Alpern et al. ................. 707/100 |

OTHER PUBLICATIONS

"*Virtual Appliances with Virtuozzo*"; Apr. 6, 2006; pp. 1-4; http://virtuozzo.livejournal.com/3130/html.
Ardence.com; "*Ardence Software-Streaming Platform*"; 1 pg; accessed Jun. 16, 2007 at http://www.ardence.com/enterprise/products.aspx?id=1624; 1 pg.
Kevin White; "*The future of Application Virtualisation*"; Mar. 30, 2006; accessed Jul. 16, 2007 at http://cbronline.com/article_cbr.asp?guid=5191C403-22CD-47F4-98BB-FBF22219C4EO; 6 pgs.

* cited by examiner

*Primary Examiner* — Lewis A Bullock, Jr.
*Assistant Examiner* — Tina Huynh
(74) *Attorney, Agent, or Firm* — Merchant & Gould

(57) ABSTRACT

Virtual applications are automatically kept up to date with the current version of a virtual application. Instead of the client having to obtain the entire version of the current virtual application, the client obtains the portions of the current virtual application that are changed from its version of the virtual application. After obtaining the changes needed to update its version of the virtual application, the client integrates those changes into its version of the virtual application.

20 Claims, 5 Drawing Sheets

VIRTUALIZED APPLICATION IMAGE PATCHING

BACKGROUND

Application virtualization decouples applications from the operating system. Virtualized application environments enable applications to bring their own set of configurations and run without installation within a virtual run-time abstraction layer on the client, so that dependencies or effects on the configuration of the operating system are minimized. Since the applications execute locally on the client, they run with full performance, functionality, and access to local services.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Virtual applications running on clients are automatically kept up to date with the current version of a virtual application. Instead of the client having to obtain the entire version of the current virtual application each time a change is made, the client obtains the portions of the current virtual application that are changed from its version of the virtual application. After obtaining the changes, the client integrates those changes into an updated version of the virtual application.

DETAILED DESCRIPTION

Figure 1:
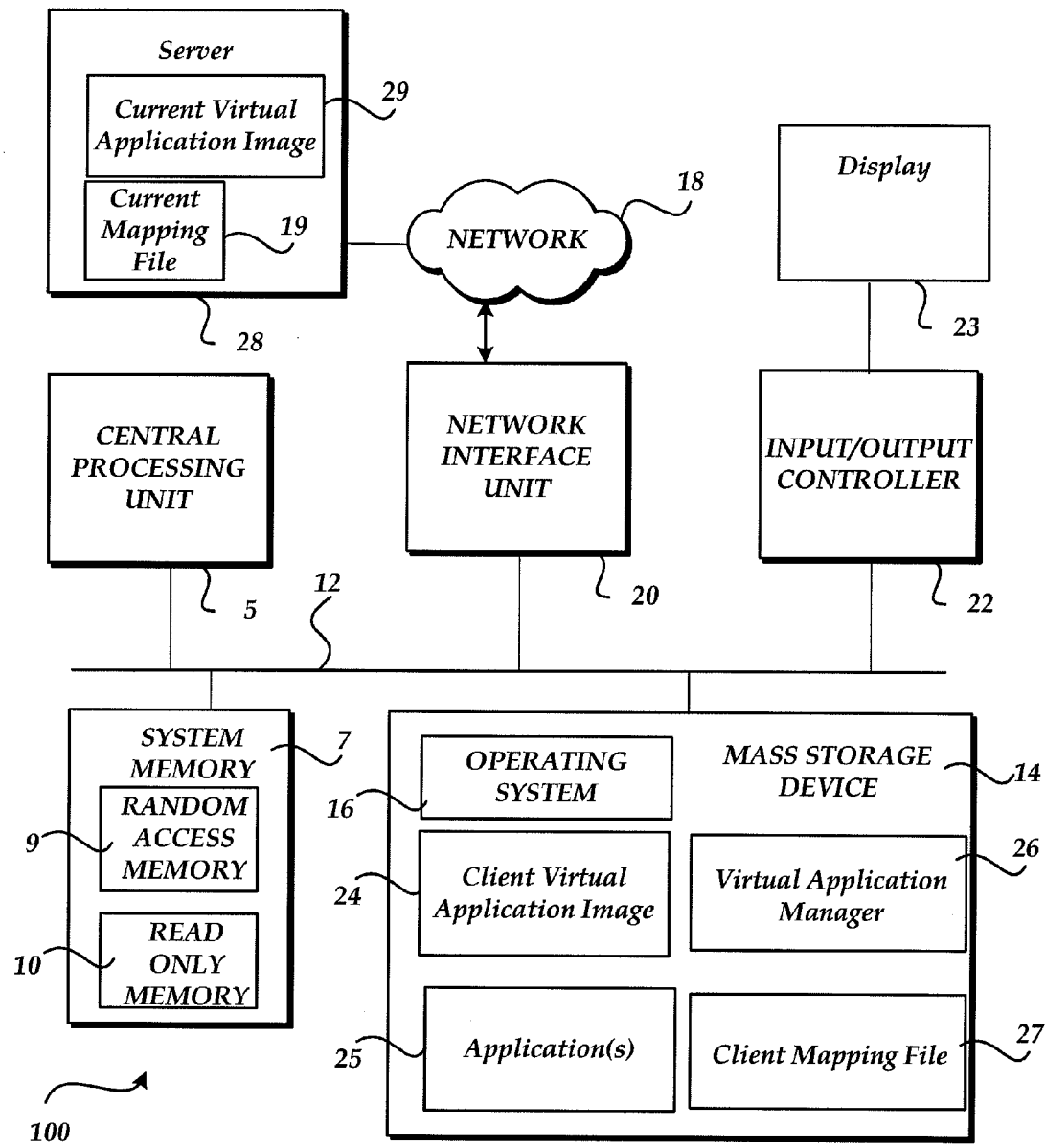
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computing environment for a computer 100 utilized in the various embodiments will be described. The computer environment shown in FIG. 1 may include devices configured as server(s), desktop or mobile computing device(s) or other devices, and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, client virtualized application(s) 24, other applications 25, virtual application manager 26 and client mapping file 27 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may be coupled to a display screen 23, a printer, or other type of input/output device.

As mentioned briefly above, a number of program modules and data files may be stored in the mass storage device 14 and RAM 9 of the computer 100, including an operating system 16 suitable for controlling the operation of a computer, such as the WINDOWS® VISTA® operating system from MICROSOFT CORPORATION of Redmond, Wash. The mass storage device 14 and RAM 9 may also store one or more program modules. In particular, the mass storage device 14 and the RAM 9 may store one or more client virtualized applications 24 that are configured to execute without being integrated into operating system 16. In standard operating system environments, applications install their settings onto the host operating system, hard-coding the entire system to fit that application's needs. When the application is installed, other applications' settings can be overwritten, possibly causing them to malfunction or break. With application virtualization, however, each virtual application brings down its own set of configurations on-demand, and executes in a way so that only it sees its own settings. Generally, client virtual application 24 is an application that is executed within a 'sandbox' environment that protects the operating system 16 from being altered. The virtualization allows the application to run on a compatible computing system without requiring the application to be installed for that specific computing device. Client virtual application 24 and current virtual application 29 may be any application that is virtualized. For example, the virtual application could be any of the programs within the MICROSOFT OFFICE® suite of applications from MICROSOFT CORPORATION of Redmond, Wash. According to one embodiment, applications may be virtualized using MICROSOFT APPLICATION VIRTUALIZATION™, formerly known as SOFTGRID APPLICATION VIRTUALIZATION™, by MICROSOFT CORPORATION of Redmond, Wash.

According to one embodiment, the virtualized applications may be virtualized per user/application instance and may virtualize many different services, such as: windowing services, registry services, file system services, DLLs, COM/IPC, .INI files, fonts and the like. While a virtual application may access information on the executing computing device, the virtual application does not alter the operating system of the computing device. For example, a virtual registry may be implemented that utilizes an "overlay" method—items in the real registry may be read by the application as long as a virtual copy of that item is not available. The writes made by the virtual application to the Registry, however, are contained within the virtual registry. The virtual application may also redirect file requests. For example, if an application looks for a file located in a specific directory on the local C drive, the virtualization service can redirect any requests to the corresponding directory inside of its virtual file system. Similarly, Dynamic Link Libraries (DLLs) specifically needed by the application are made available within the virtualization service, avoiding conflicts with different versions of the same DLL that may be installed locally. These components are shared and tracked inside of the Virtual File System. The virtualization service may also enable programs to redirect communication requests through services such as COM/DCOM or IPC methods such as Named Pipes. This helps alleviates versioning problems and other conflicts at these interfaces. Each virtual application or instance may also maintain its own private settings within virtual copies of standard MICROSOFT WINDOWS® .ini files.

Virtual applications utilize a virtual image file to store all of the information and data that is associated with a virtual application. These virtual image files may be very large (i.e. 1 gigabyte) making transfer of these files time consuming. The virtual application image file 24 captures the setup-time changes and run-time changes made to the computing device by an application (or suite of applications). Files that would have been written to the computing device are instead written across blocks in the virtual application image file. The virtual application image file may be hosted on server(s) which stream the bits over time to the local cache of the client machines or the virtual application may be stored on a local data store of a client. The transfer of these image files is even more time consuming on slower computing devices and/or storage units.

Virtual application manager 26 is directed at managing the updating of the virtual applications that are stored on and/or utilized by a client device. According to one embodiment, virtual application manager 26 helps to ensure that the version of the client virtual application 24 is the current version 29 of the virtual application that is currently published. For example, in the exemplary environment, server 28 stores the latest version of the virtual application (current virtual application 29). Virtual application manager 26 compares the current virtual application 29 with the client virtual application 29 to determine the portions of the virtual application that are changed. According to one embodiment, a current mapping file 19 is compared with the client mapping file 27 to determine the changes. According to one embodiment, each mapping file (client mapping file 27 and current mapping file 19) includes a hash value for each block within the associated virtual application. The mapping files may also include other information such as: location of the blocks within the application image; flags; and other information. More information on the mapping files is included below.

Instead of the client having to obtain the entire version of the current virtual application, the client obtains the portions of the current virtual application that are changed from its version of the virtual application. After obtaining the changes from server 29 needed to update its version of the virtual application, the virtual application manager 26 integrates those changes into its version of the virtual application on the client. More details regarding the operation of virtual application manager will be described below.

Figure 2:
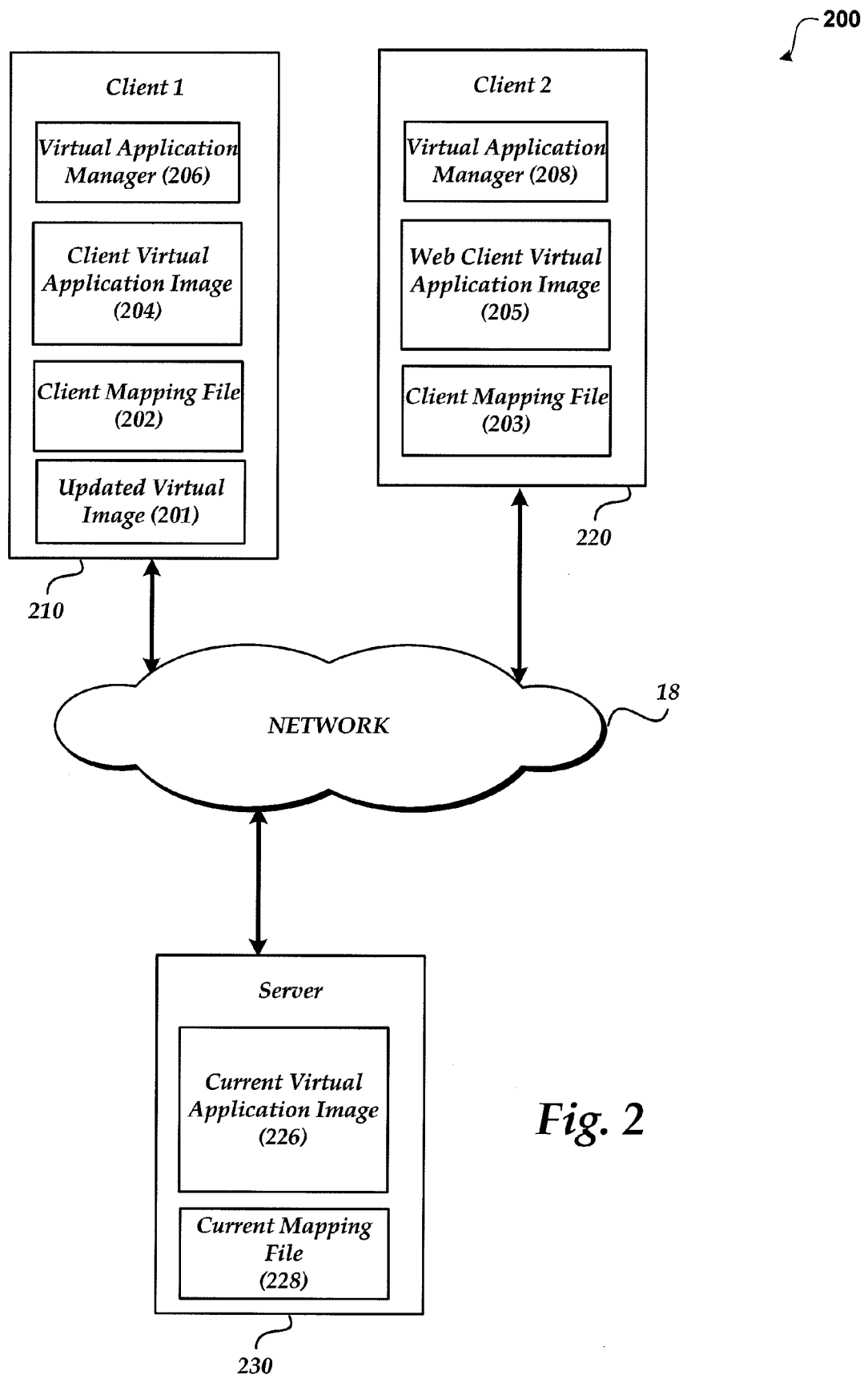
FIG. 2 shows a virtual application image patching system.

FIG. 2 shows a system 200 for patching a virtual application. As illustrated, system 200 includes client 210, client 220 and server 230. Client 1 includes virtual application manger 206, client virtual application image file 204, client mapping file 202 and updated virtual image 201. Client 2 includes virtual application manger 208, Web client virtual application image file 205 and client mapping file 203. Server includes current virtual application image file 226 and current mapping file 228.

A virtual application may be run from a client device using different methods. According to one embodiment, the virtual application may be run either in a networked mode or a device mode. In the networked mode, the virtual application is hosted on a web server (i.e. server 230) and the virtual application image file is streamed to a memory store, such as a local cache on the client (i.e. Client 2). In the device mode, the virtual application is stored on a local data store of the client and the device accesses the virtual application from the local data store.

As illustrated, Client 1 is configured to host the virtual application image on a local storage device (device mode). Client 2 is configured to access the virtual application on a web server (i.e. server 230) and to store at least a portion of the application image file within its memory, such as within a cache (networked mode). Server 230 stores the most current version of the virtual image file for each of the virtualized application(s). Since each client may directly determine the changes between its version of the virtual application image file and the server's version of the virtual application image file, storing multiple versions and/or storing delta patches between each version is not needed.

When an update is made to a virtual application image file, the following changes can occur to the file: (1) the initial file header may change; (2) one or more of the blocks may be modified; (3) one or more of the blocks may be removed; (4) one or more blocks may be added; and (5) the order of the blocks within the image file may change.

Figure 3:
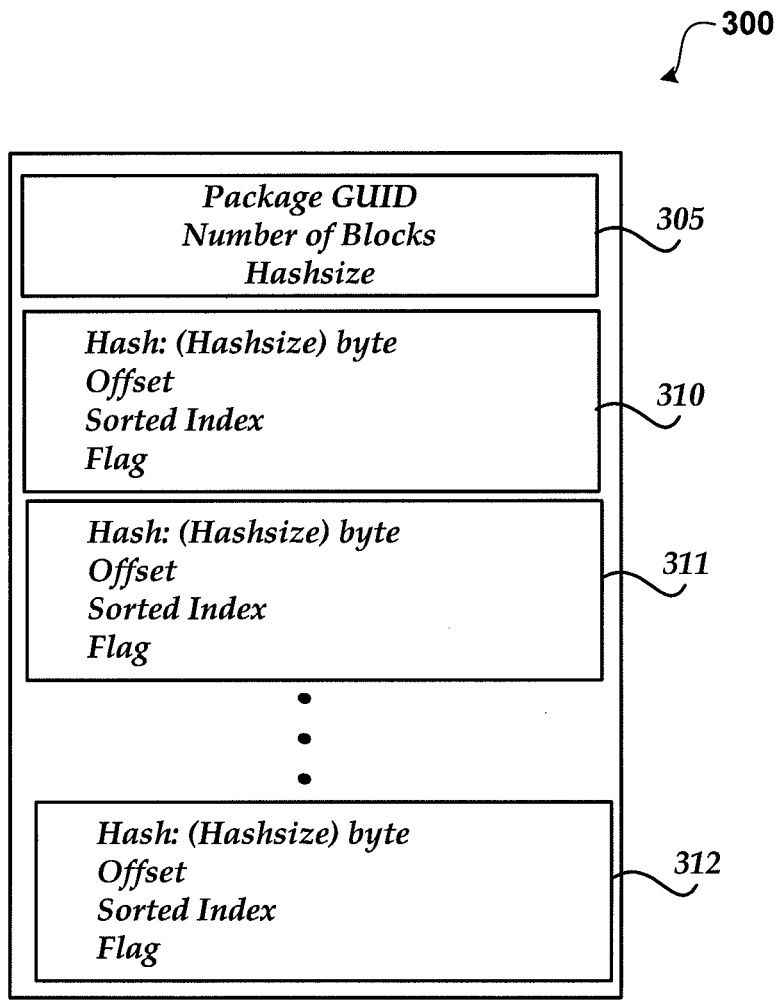
FIG. 3 shows an example of a mapping file.

According to one embodiment, the mapping files (202, 203 and 228) include a hash for each block within its associated virtual application image file along with an offset to determine where in the associated virtual image file the block is located (See FIG. 3 and related discussion for an exemplary hash mapping file structure). In the networked mode embodiment, the mapping file also includes a flag indicating whether or not a block is essential in executing the virtual application. In the current example, suppose that server 230 includes a current virtual application image file 226 that is a different version than is stored on client 1 or client 2.

In an exemplary scenario, Client 1 downloads the current mapping file 228 from server 230 and stores it within a local data store, such as the client's hard drive, RAM, ROM, USB device, and the like. Then, for each hash map entry in the current mapping file 228, the virtual application manager 206 attempts to lookup the hash in the client mapping file 202. If the hash is not found, then virtual application manager 206 requests the block from the current virtual application image file 226 from server 230 and writes the obtained block to the updated virtual image file 201. If the hash is located then the block within the client virtual application image file 204 is copied to an updated virtual application image file 201.

Client 2 behaves somewhat differently since it is operating in the networked mode. In networked mode, the client may not include all of the blocks of a virtual image file within its memory since only the blocks previously requested and needed for its current operation may be stored. According to one embodiment, Client 2 would not store all of the blocks of the virtual application image file residing on the server until they were all requested. Client 2 downloads the current mapping file 228 from server 230 and stores it within a local memory and/or data store. When a new image file is published, the blocks within the image file that have changed are invalidated in the local cache on the client by the virtual application manager 208. Then, for each hash map entry in the current mapping file 228, the virtual application manager 208 attempts to lookup the hash in the client mapping file 203. If the hash is not found or if the block is marked as essential, then virtual application manager 206 requests the block from the current virtual application image file 226 from server 230. According to one embodiment, a block is marked as essential when it is required when executing the virtual application 205. An update may also be delivered automatically to client 220 before the web client executes the virtual application. In this way, the memory of client 220 will include the blocks required to execute the application (the blocks marked essential) thereby allowing the user to go offline when they want and never experience application downtime due to invalidated blocks in the local cache.

As can be seen by the examples, the client is able to perform the comparisons between the versions without requiring the server to calculate the comparisons. Additionally, there is no need to calculate all of the permutations between various versions of the virtual image. In this way, only the current virtual image file is published.

FIG. 3 shows an example of a mapping file. According to one embodiment, the mapping file 300 includes a header 305 and hash map entries (310-312) for each block within the virtual image file.

Header 305 includes a unique identifier that identifies the virtual image file, the number of blocks that are contained within the virtual image file and a hashsize. According to one embodiment, each Hash map entry (e.g. 310, 311, 312) in the mapping file includes a Hash field, an Offset field, a SortedIndex field and a Flag field. More or less fields may be included in the mapping file. For example, each Hash map entry may include a Hash field and an Offset field.

The Hash field stores the hash of the corresponding block in virtual image file. According to one embodiment, the hashes are created using the Message-Digest algorithm 5 (MD5) hash function. MD5 is a widely used, partially insecure cryptographic hash function with a 128-bit hash value. While MD5 may occasionally result in collisions, the hash size is small which helps in creating a mapping file that is smaller and quicker to transfer as compared to using larger hash values. Some hashing functions, on the other hand, may not have collisions but the size of the virtual image mapping file will be much larger due to the size of the hash, and therefore slower to transfer. For example, if a Secure Hash Algorithm (SHA-512) were utilized, the virtual image mapping file would be much larger as compared to a file hashed using the MD5 hashing function.

The Offset field is the starting offset of the corresponding block in the virtual image file. The SortedIndex field is used when performing a binary search look up of a hash value. The flag field is used to provide extra information for a block. For example, the flag field may be used to indicate that the block is essential for operation of the virtual application.

Figure 4:
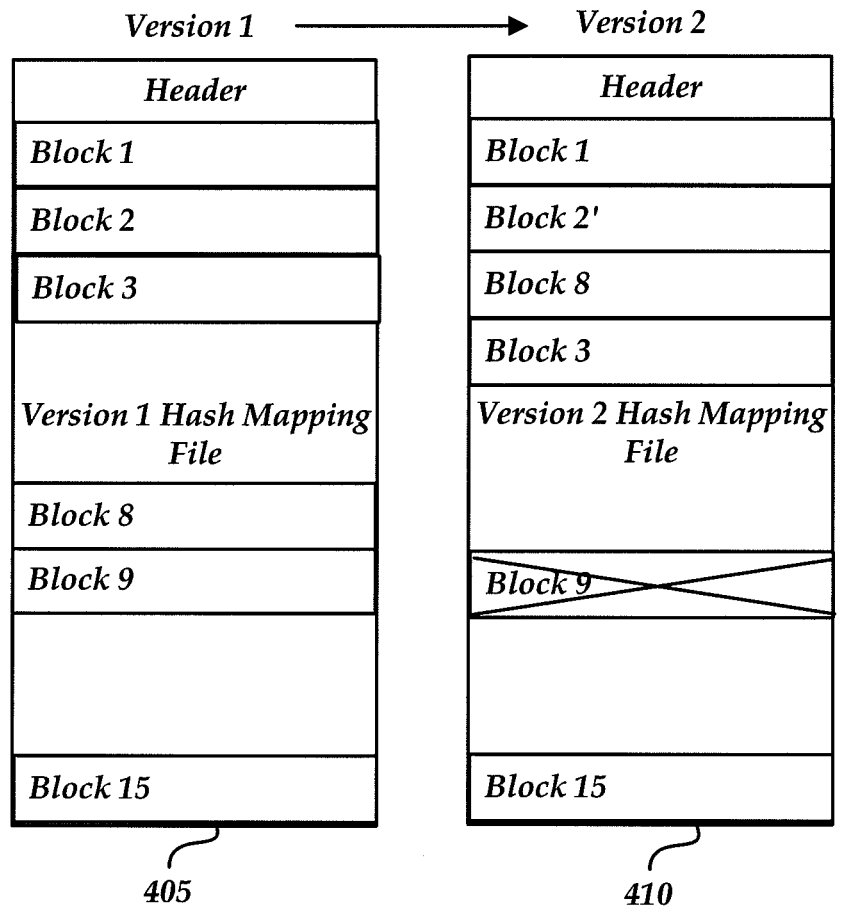
FIG. 4 illustrates moving from a first version to a second version of a virtual application.

FIG. 4 illustrates moving from a first version to a second version of a virtual application. As illustrated, the first version of the virtual image file (405) is being updated to version 2 of the virtual image file (410).

Each block of the hash image files represents an actual block in the corresponding virtual image file. To determine the changes to update the current client version of the image file a comparison is made between the two hash image files. According to one embodiment, both the version 1 hash mapping file and the version 2 hash mapping file are located on the client device before the comparison is started. For example, the client may store its current version of the hash mapping file (in this case mapping file 405) and download the most recent hash mapping file (in this case mapping file 410) from the network data store.

As discussed above, the comparison determines what blocks have been modified; what blocks have been removed; what blocks have been added; and what blocks have been moved. Each block within the version 2 hash mapping file is accessed and then used to determine the changes made to the version 1 image file. In this example, Block 1 has remained the same between version 1 and version 2. As such, no changes have to be made to the current block 1 within the actual virtual image file stored on a data store that is associated with the client. Since no changes have been made, Block 1 within the image file may be written to an updated image file on the client device. According to another embodiment, the blocks may be written to the updated image file after the comparisons of the block are complete. The comparison of the Block 2 hash in version 2 shows that Block 2 has been modified. In this case, Block 2 is downloaded from the network data store and then written to the updated virtual image file. According to one embodiment, Block 2 within version 2 of the virtual image file is located by using the Offset value that is stored within the hash mapping file block. Other methods may also be used. For example, a predetermined offset may be utilized. Continuing with the example, Block 8 has not changed, but has been moved within the virtual image file. Block 8 is obtained from the client's virtual image and written to the updated virtual image file. Similarly, Block 3 has not changed but has been moved. Block 3 is written to the updated virtual image file. In the current example, no changes have been made to blocks 4 through 7, so those blocks are written to the updated virtual image file. Block 9 no longer exists in version 2 so it is not written to the updated virtual image file on the client device. The process continues through each block until the virtual image file on the client is updated to the version 2 virtual image file. As can be seen, only the blocks that have been changed are downloaded to the client device thereby saving system resources. Once updated, the version 2 hash mapping file becomes the current mapping file for the client.

Figure 5:
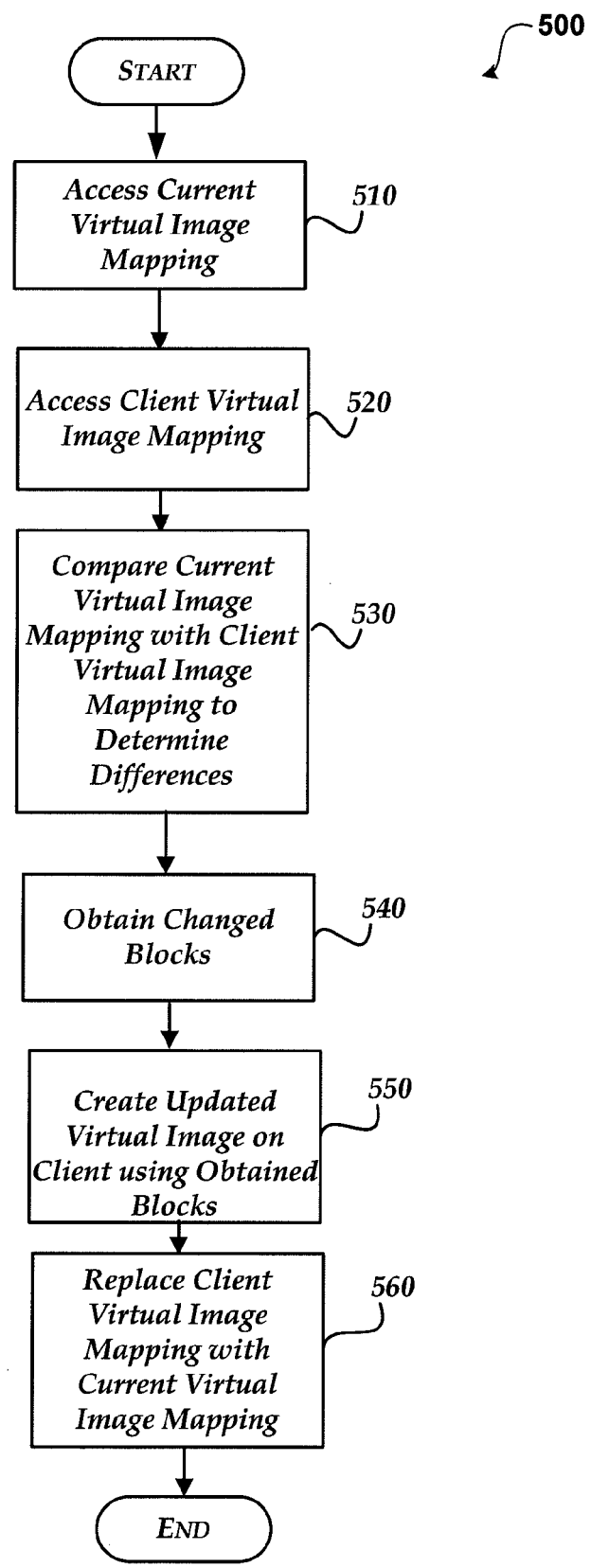
FIG. 5 shows an illustrative process for patching a virtual application.

Referring now to FIG. 5, an illustrative process 500 for virtual application image patching will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 510, where the current virtual image mapping is accessed. According to one embodiment, the hash mapping file is downloaded to the client device from the network data store that contains the most recently published virtual image file.

Moving to operation 520, the client's virtual image mapping is accessed on the client device. The client's virtual image mapping file corresponds to the virtual image mapping file on the client device.

Flowing to operation 530, the current virtual image mapping file is compared with the client's virtual image mapping file to determine the differences between the two versions. As discussed above, to determine the changes made between the client's version of the image file and the current version of the virtual image file, each hash within the current virtual image mapping file is used to determine if the corresponding block within the virtual image file currently exists or has changed as compared to the client's virtual image file. Any block that has changed or has been added is marked to be downloaded from the network data store that currently stores the most recently published virtual image file. According to another embodiment, any block that is marked as essential within the current virtual image mapping file is also marked to be downloaded.

Moving to operation 540, the blocks within the most recently published virtual image file are obtained from the data store. According to one embodiment, all of the changed blocks are obtained at one time. According to another embodiment, the blocks are obtained when identified in the comparison operation (operation 530). According to one embodiment, a download monitor is used to determine the download status of the blocks. In this way, if the download is disrupted then the download may be resumed from the point where it was left off.

Transitioning to operation 550, the client creates an updated virtual image file that corresponds to the most recently published virtual image file. Each block is written to the client's virtual image file in the order that is specified within the current virtual image mapping file.

Moving to operation 560, the client's virtual image mapping file is replaced with the current virtual image file. In this way, the client's virtual image mapping file corresponds to the updated virtual image that is stored on the client device. The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for patching a virtualized application, comprising:
    storing a current version of a virtual application image at a first location; wherein the virtual application image captures setup-time changes and run-time changes made to a computing device by the virtualized application; wherein the virtual application image is segmented into blocks;
    accessing a current mapping file from the first location for the current version of the virtual application image that is a separate file from the virtual application image and comprises a number of blocks in the virtual application image and a location of each block in the virtual application image;
    storing the current mapping file on a client computing device that is configured to run the virtualized application;
    determining on the client computing device changes to a client virtual application image by comparing the current mapping file to a client mapping file stored on the client computing device, wherein the client mapping file comprises a number of blocks in the client virtual application image and a location of each block in the client virtual application image;
    obtaining essential blocks from the virtual application image from the first location when the client computing device is executing the virtualized application in a network mode, wherein the blocks that are marked as essential for execution are downloaded;
    obtaining the changes from the current version of the virtual application image at the first location; and
    updating a client version of the client virtual application image using the obtained changes and any portion of the client virtual application image that did not change.

2. The method of claim 1, wherein the current mapping file and the client mapping file comprise a hash for each block within its respective virtual application image.

3. The method of claim 2, wherein a location of each block is specified as an offset within the virtual application image.

4. The method of claim 1, wherein the first location is a first network location and wherein determining the changes to the client virtual application image occur on the client computing device that is storing the client virtual application image.

5. The method of claim 1, wherein the current version of the virtual application image is more than one version different as compared to the client version of the virtual application image.

6. The method of claim 2, wherein comparing the current mapping file to the client mapping file comprises determining hashes within the current mapping file that are located within the client mapping file and for each of the hashes located using an associated block within the client virtual application image within an updated virtual application image.

7. The method of claim 6, wherein comparing the current mapping file to the client mapping file comprises determining the hashes within the current mapping file that are not located within the client mapping file and for each of the hashes that are not located obtaining the associated block from the first location.

8. The method of claim 1, wherein accessing the current mapping file from the first location comprises downloading the current mapping file from the first location to the client computing device.

9. The method of claim 1, wherein the networked mode includes streaming blocks of the client virtual application image when needed for execution.

10. The method of claim 1, further comprising resuming a download from a previous state when only a portion of the blocks have been obtained and the download was not completed.

11. A computer-readable storage medium, excluding a signal, having computer-executable instructions for updating a virtual application image, comprising:
- downloading a current mapping file from a first network location to a client computing device; wherein the current mapping file is associated with a current version of the virtual application image and is a separate file from the virtual application image; wherein the virtual application image captures setup-time changes and run-time changes made to a computing device by a virtualized application; wherein the virtual application image is segmented into blocks;
- determining on the client computing device changes to a client virtual application image that is stored on the client computing device by comparing the current mapping file to a client mapping file previously stored on the client computing device and separate from the client virtual application image; wherein determining the changes occurs on the client computing device;
- obtaining essential blocks from the virtual application image from the first network location when the client computing device is executing the virtualized application in a network mode, wherein the blocks that are marked as essential are downloaded;
- downloading the changes from the current version of the virtual application image; and
- creating an updated version of the client virtual application image by using the downloaded changes and any portion of the client virtual application image that was determined to not change.

12. The computer-readable storage medium of claim 11, wherein the current mapping file and the client mapping file each comprise a hash for each block and a location of each block within their respective virtual application image.

13. The computer-readable storage medium of claim 11, wherein comparing the current mapping file to the client mapping file comprises for each block within the current virtual image file determining whether the hash of the block is located within the client mapping file and for each block where the hash is located using the corresponding block within the client virtual application image within the updated version of the client virtual application image.

14. The computer-readable storage medium of claim 13, wherein comparing the current mapping file to the client mapping file comprises for each block within the current virtual image file determining whether the hash of the block is not located within the client mapping file and for each block where the hash is not located downloading the block and using the downloaded block within the updated version of the client virtual application image.

15. A system for updating a virtual application on a client device comprising:
- a server computing device that is configured to store a current version of a virtual application image and a current mapping file that is a separate file from the virtual application image and comprises a number of blocks in the virtual application image and a location of each block in the virtual application image; wherein the virtual application image captures setup-time changes and run-time changes made to a computing device by the virtualized application; wherein the virtual application image is segmented into blocks; wherein the current mapping file includes a hash for each block within the virtual application image; and
- the client computing device that comprises:
  - a data store that is configured to store a client virtual application image and a client mapping file; wherein the client virtual application image captures setup-time changes and run-time changes made to the computing device by the virtualized application; wherein the client virtual application image is segmented into blocks; wherein the client mapping file includes a hash for each block within the client virtual image;
  - a network connection that is configured to connect to the server computing device;
  - a processor and a computer-readable medium;
  - an operating environment stored on the computer-readable medium and executing on the processor; and
  - a virtual application manager operating under the control of the operating environment and operative to:
    - download the current mapping file from the server computing device and store the current mapping file in the data store; obtaining essential blocks from the virtual application image from the server computing device when the client computing device is executing the virtual application in a network mode, wherein the blocks are marked that are marked as essential are downloaded; on the client computing device determine the blocks that have changed within the client virtual application image by attempting to locate each hash within the current mapping file within the client mapping file stored on the client computing device;
    - download the blocks that have changed from the current version of the virtual application image from the server; and
    - create an updated version of the client virtual application image by using the downloaded blocks and any blocks of the client virtual application image that were determined to not change.

16. The system of claim 15, wherein attempting to locate each hash within the current mapping file within the client mapping file comprises for each hash within the current mapping file determining whether the hash of the block is not located within the client mapping file and for each block where the hash is not located marking the block to be downloaded.

17. The system of claim 16, wherein the current mapping file includes the hash of block within the virtual application image; and an offset to the block within the virtual application image and wherein the client mapping file include the hash of the block within the client virtual application image; and an offset to the block within the client virtual application image.

18. The system of claim 16, wherein the server computing device is configured to stream the blocks of the virtual application image to the client; and wherein the client computing device stores the streamed blocks within a cache.

19. The system of claim 18, wherein the server is further configured to determine the blocks to stream in response to a current execution of the client computing device.

20. The system of claim 15, wherein the networked mode includes streaming blocks of the client virtual application image when needed for execution the blocks

* * * * *